US006552567B1

(12) United States Patent
Boles et al.

(10) Patent No.: US 6,552,567 B1
(45) Date of Patent: Apr. 22, 2003

(54) FUNCTIONAL PATHWAY CONFIGURATION AT A SYSTEM/IC INTERFACE

(75) Inventors: Brian Boles, Mesa, AZ (US); Richard Fischer, Mesa, AZ (US); Sumit Mitra, Tempe, AZ (US); Rodney Drake, Mesa, AZ (US); Stephen A. Bowling, Chandler, AZ (US); Bryan Kris, Chandler, AZ (US); Steven Marsh, Phoenix, AZ (US); Hassan Harb, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 67 days.

(21) Appl. No.: 09/964,664

(22) Filed: Sep. 28, 2001

(51) Int. Cl.[7] .......................................... H03K 19/0175
(52) U.S. Cl. ....................................... 326/63; 327/333
(58) Field of Search ................................ 257/678, 690, 257/691, 692, 693, 694, 696, 697, 698; 326/62, 63; 327/333

(56) References Cited

U.S. PATENT DOCUMENTS

| 3,781,810 A | 12/1973 | Downing |
| 4,398,244 A | 8/1983 | Chu et al. |
| 4,472,788 A | 9/1984 | Yamazaki |
| 4,481,576 A | 11/1984 | Bicknell |
| 4,488,252 A | 12/1984 | Vassar |
| 4,511,990 A | 4/1985 | Hagiwara et al. |
| 4,556,938 A | 12/1985 | Parker et al. |
| 4,626,988 A | 12/1986 | George |
| 4,730,248 A | 3/1988 | Watanabe et al. |
| 4,782,457 A | 11/1988 | Cline |
| 4,807,172 A | 2/1989 | Nukiyama |
| 4,829,420 A | 5/1989 | Stahle |
| 4,829,460 A | 5/1989 | Ito |
| 4,839,846 A | 6/1989 | Hirose et al. |
| 4,872,128 A | 10/1989 | Shimizu |
| 4,882,701 A | 11/1989 | Ishii |
| 4,941,120 A | 7/1990 | Brown et al. |
| 4,943,940 A | 7/1990 | New |
| 4,959,776 A | 9/1990 | Deerfield et al. |
| 4,977,533 A | 12/1990 | Miyabayashi et al. |
| 4,984,213 A | 1/1991 | Abdoo et al. |
| 5,007,020 A | 4/1991 | Inskeep |
| 5,012,441 A | 4/1991 | Retter |
| 5,032,986 A | 7/1991 | Pathak et al. |
| 5,038,310 A | 8/1991 | Akagiri et al. |
| 5,056,004 A | 10/1991 | Ohde et al. |
| 5,099,445 A | 3/1992 | Studor et al. |
| 5,101,484 A | 3/1992 | Kohn |
| 5,117,498 A | 5/1992 | Miller et al. |
| 5,122,981 A | 6/1992 | Taniguchi |
| 5,155,823 A | 10/1992 | Tsue |
| 5,197,023 A | 3/1993 | Nakayama |
| 5,197,140 A | 3/1993 | Balmer |
| 5,206,940 A | 4/1993 | Murakami et al. |
| 5,212,662 A | 5/1993 | Cocanougher et al. |
| 5,276,634 A | 1/1994 | Suzuki et al. |

(List continued on next page.)

Primary Examiner—Olik Chaudhuri
Assistant Examiner—Dana Farahani
(74) Attorney, Agent, or Firm—Swidler Berlin Shereff Friedman, LLP

(57) ABSTRACT

The present invention relates generally to functional pathway configurations at the interfaces between integrated circuits (ICs) and the circuit assemblies with which the ICs communicate. More particularly, the present invention relates generally to the functional pathway configuration at the interface between one or more semiconductor integrated circuit dice, including an IC package and the circuitry of a system wherein the integrated circuit dice is a digital signal controller. Even more particularly, the present invention relates to a 18, 28, 40, 44, 64 or 80 pin functional pathway configuration for the interface between the digital signal controller and the system in which it is embedded.

10 Claims, 8 Drawing Sheets

U.S. PATENT DOCUMENTS

| | | | |
|---|---|---|---|
| 5,282,153 A | 1/1994 | Bartkowiak et al. |
| 5,327,543 A | 7/1994 | Miura et al. |
| 5,327,566 A | 7/1994 | Forsyth |
| 5,379,240 A | 1/1995 | Byrne |
| 5,448,703 A | 9/1995 | Amini et al. |
| 5,448,706 A | 9/1995 | Fleming et al. |
| 5,463,749 A | 10/1995 | Wertheizer et al. |
| 5,469,377 A | 11/1995 | Amano |
| 5,471,600 A | 11/1995 | Nakamoto |
| 5,497,340 A | 3/1996 | Uramoto et al. |
| 5,499,380 A | 3/1996 | Iwata et al. |
| 5,548,544 A | 8/1996 | Matheny et al. |
| 5,568,412 A | 10/1996 | Han et al. |
| 5,596,760 A | 1/1997 | Ueda |
| 5,600,813 A | 2/1997 | Nakagawa et al. |
| 5,619,711 A | 4/1997 | Anderson |
| 5,642,516 A | 6/1997 | Hedayat et al. |
| 5,689,693 A | 11/1997 | White |
| 5,694,350 A | 12/1997 | Wolrich et al. |
| 5,696,711 A | 12/1997 | Makineni |
| 5,706,460 A | 1/1998 | Craig et al. |
| 5,715,470 A | 2/1998 | Asano et al. |
| 5,737,570 A | 4/1998 | Koch |
| 5,740,419 A | 4/1998 | Potter |
| 5,748,516 A | 5/1998 | Goddard et al. |
| 5,764,555 A | 6/1998 | McPherson et al. |
| 5,774,711 A | 6/1998 | Henry et al. |
| 5,778,416 A | 7/1998 | Harrison et al. |
| 5,790,443 A | 8/1998 | Shen et al. |
| 5,808,926 A | 9/1998 | Gorshtein et al. |
| 5,813,439 A | 9/1998 | Hansen |
| 5,825,730 A | 10/1998 | Nishida et al. |
| 5,826,096 A | 10/1998 | Baxter |
| 5,828,875 A | 10/1998 | Halvarsson et al. |
| 5,862,065 A | 1/1999 | Muthusamy |
| 5,880,984 A | 3/1999 | Burchfiel et al. |
| 5,892,697 A | 4/1999 | Brakefield |
| 5,892,699 A | 4/1999 | Duncan et al. |
| 5,894,428 A | 4/1999 | Harada |
| 5,909,385 A | 6/1999 | Nishiyama et al. |
| 5,917,741 A | 6/1999 | Ng |
| 5,930,159 A | 7/1999 | Wong |
| 5,930,503 A | 7/1999 | Drees |
| 5,938,759 A | 8/1999 | Kamijo |
| 5,941,940 A | 8/1999 | Prasad et al. |
| 5,943,249 A | 8/1999 | Handlogten |
| 5,951,627 A | 9/1999 | Kiamilev et al. |
| 5,951,679 A | 9/1999 | Anderson et al. |
| 5,991,787 A | 11/1999 | Abel et al. |
| 5,996,067 A | 11/1999 | White |
| 6,009,454 A | 12/1999 | Dummermuth |
| 6,014,723 A | 1/2000 | Tremblay et al. |
| 6,026,489 A | 2/2000 | Wachi et al. |
| 6,044,392 A | 3/2000 | Anderson et al. |
| 6,044,434 A | 3/2000 | Oliver |
| 6,058,409 A | 5/2000 | Kozaki et al. |
| 6,058,410 A | 5/2000 | Sharangpani |
| 6,058,464 A | 5/2000 | Taylor |
| 6,061,780 A | 5/2000 | Shippey et al. |
| 6,076,154 A | 6/2000 | Van Eijndhoven et al. |
| 6,101,521 A | 8/2000 | Kosiec |
| 6,115,732 A | 9/2000 | Oberman et al. |
| 6,128,728 A | 10/2000 | Dowling |
| 6,134,574 A | 10/2000 | Oberman et al. |
| 6,145,049 A | 11/2000 | Wong |

```
              ┌────┐
AN6/SCK1/INT0/OCFA ─┤1  18├─ AN7/IC2/OC2
AN5/U1RX/SDI1/IDT1/CN7/PGD ─┤2  17├─ IC1/OC1
AN4/U1TX/SDO1/ICK1/CN6/PGC ─┤3  16├─ OSC1/CLKIN
              MCLR ─┤4  15├─ OSC2/CLKO
               Vss ─┤5  14├─ Vdd
       AN0/VREF+/CN2 ─┤6  13├─ SOSC2/T2CK/U1TX/CN1
       AN1/VREF-/CN3 ─┤7  12├─ SOSC1/T1CK/U1RX/CN0
              AVdd ─┤8  11├─ AN3/CN5
              AVss ─┤9  10├─ AN2/CN4
              └────┘
```

FIGURE 1A

```
              MCLR ─┤1  28├─ AVdd
       AN0/VREF+/CN2 ─┤2  27├─ AVss
       AN1/VREF-/CN3 ─┤3  26├─ AN6/OCFA
            AN2/CN4 ─┤4  25├─ AN7
            AN3/CN5 ─┤5  24├─ AN8/OC1
            AN4/CN6 ─┤6  23├─ AN9/OC2
            AN5/CN7 ─┤7  22├─ U2RX
                Vss ─┤8  21├─ U2TX
          OSC1/CLKIN ─┤9  20├─ Vdd
          OSC2/CLKO ─┤10 19├─ Vss
    SOSC2/T2CK/U1TX/CN1 ─┤11 18├─ U1RX/SDI1/IDT1/PGD
    SOSC1/T1CK/U1RX/CN0 ─┤12 17├─ U1TX/SDO1/ICK1/PGC
                Vdd ─┤13 16├─ SCK1/INT0
            IC2/INT2 ─┤14 15├─ IC1/INT1
```

FIGURE 1B

```
              MCLR ─┤1  40├─ AVdd
       AN0/VREF+/CN2 ─┤2  39├─ AVss
       AN1/VREF-/CN3 ─┤3  38├─ AN9/CSCK
            AN2/CN4 ─┤4  37├─ AN10/CSDI
            AN3/CN5 ─┤5  36├─ AN11/CSDO
         AN4/IC7/CN6 ─┤6  35├─ AN12/COFS
         AN5/IC8/CN7 ─┤7  34├─ OC1
          AN6/OCFA ─┤8  33├─ OC2
                AN7 ─┤9  32├─ Vdd
                AN8 ─┤10 31├─ Vss
                Vdd ─┤11 30├─ CRX1
                Vss ─┤12 29├─ CTX1
          OSC1/CLKIN ─┤13 28├─ U2RX
          OSC2/CLKO ─┤14 27├─ U2TX
    SOSC2/T2CK/U1TX/CN1 ─┤15 26├─ U1RX/SDI1/IDT1/PGD
    SOSC1/T1CK/U1RX/CN0 ─┤16 25├─ U1TX/SDO1/ICK1/PGC
               INT0 ─┤17 24├─ SCK1
            IC2/INT2 ─┤18 23├─ IC1/INT1
                OC4 ─┤19 22├─ OC3
                Vss ─┤20 21├─ Vdd
```

FIGURE 1C

```
           MCLR ⎕ 1        28 ⎕ AVdd
    AN0/VREF+/CN2 ⎕ 2       27 ⎕ AVss
    AN1/VREF-/CN3 ⎕ 3       26 ⎕ PWM0
         AN2/CN4 ⎕ 4        25 ⎕ PWM1
    AN3/INDX/CN5 ⎕ 5        24 ⎕ PWM2
  AN4/QEA/IC7/CN6 ⎕ 6       23 ⎕ PWM3
  AN5/QEB/IC8/CN7 ⎕ 7       22 ⎕ PWM4
             Vss ⎕ 8        21 ⎕ PWM5
       OSC1/CLKIN ⎕ 9       20 ⎕ Vdd
        OSC2/CLKO ⎕ 10      19 ⎕ Vss
SOSC2/T2CK/U1TX/CN1 ⎕ 11    18 ⎕ U1RX/SDI1/IDT1/CRX1/PGD
SOSC1/T1CK/U1RX/CN0 ⎕ 12    17 ⎕ U1TX/SDO1/ICK1/CTX1/PGC
             Vdd ⎕ 13       16 ⎕ FLTA/INT0/SCK1/OCFA
     OC2/IC2/INT2 ⎕ 14      15 ⎕ OC1/IC1/INT1
```

FIGURE 2A

```
           MCLR ⎕ 1        40 ⎕ AVdd
    AN0/VREF+/CN2 ⎕ 2       39 ⎕ AVss
    AN1/VREF-/CN3 ⎕ 3       38 ⎕ PWM0
         AN2/CN4 ⎕ 4        37 ⎕ PWM1
    AN3/INDX/CN5 ⎕ 5        36 ⎕ PWM2
  AN4/QEA/IC7/CN6 ⎕ 6       35 ⎕ PWM3
  AN5/QEB/IC8/CN7 ⎕ 7       34 ⎕ PWM4
        AN6/OCFA ⎕ 8        33 ⎕ PWM5
             AN7 ⎕ 9        32 ⎕ Vdd
             AN8 ⎕ 10       31 ⎕ Vss
             Vdd ⎕ 11       30 ⎕ CRX1
             Vss ⎕ 12       29 ⎕ CTX1
       OSC1/CLKIN ⎕ 13      28 ⎕ U2RX
        OSC2/CLKO ⎕ 14      27 ⎕ U2TX
SOSC2/T2CK/U1TX/CN1 ⎕ 15    26 ⎕ U1RX/SDI1/IDT1/PGD
SOSC1/T1CK/U1RX/CN0 ⎕ 16    25 ⎕ U1TX/SDO1/ICK1/PGC
        FLTA/INT0 ⎕ 17      24 ⎕ SCK1
     OC2/IC2/INT2 ⎕ 18      23 ⎕ OC1/IC1/INT1
             OC4 ⎕ 19       22 ⎕ OC3
             Vss ⎕ 20       21 ⎕ Vdd
```

FIGURE 2B

US 6,552,567 B1

FUNCTIONAL PATHWAY CONFIGURATION AT A SYSTEM/IC INTERFACE

FIELD OF THE INVENTION

The present invention relates generally to functional pathway configurations at the interfaces between integrated circuit (IC) packages and the circuit assemblies with which the IC packages communicate. More particularly, the present invention relates generally to the functional pathway configuration at the interface between one or more semiconductor integrated circuit dice and the circuitry of a system, wherein the integrated circuit dice is a digital signal controller. Even more particularly, the present invention relates to a 18, 28, 40, 44, 64 or 80 pin functional pathway configuration for the interface between a digital signal controller and the system in which it is embedded.

BACKGROUND OF THE INVENTION

The electronics industry is generally divided into two main segments: application products companies and semiconductor companies. The application products companies segment includes the companies that design, manufacture, and sell a wide variety of semiconductor-based goods. The semiconductor companies segment includes integrated circuit (IC) design companies (e.g., fabless companies which may design and/or sell semiconductor chips), foundries (e.g., companies that manufacture chips for others), and partially or fully integrated companies that may design, manufacture, package and/or market chips to application products companies.

There is a large range of semiconductor-based goods available across a broad spectrum of applications, e.g., goods which include one or more semiconductor devices, in applications ranging from manufactured printed circuit boards to consumer electronic devices (stereos, computers, toasters, microwave ovens, etc.) and automobiles (which, for example, include semiconductor devices in fuel injection, anti-lock brake, power windows and other on-board systems). Thus there also are a wide variety of semiconductor devices available to meet the various requirements of such products and applications.

Digital signal controllers are devices that incorporate digital signal processing features and microcontrollers into a single device. Digital signal controllers themselves may be considered digital signal processors, microcontrollers or microprocessors due to their hybrid nature. In general, these devices offer an attractive combination of performance, price and features that places them near the middle of the range between high end and low end digital signal processors and microprocessors/microcontrollers. Digital signal controllers are ideal for applications that demand a level of signal processing performance that may exceed that offered by a microcontroller but may be too low to justify the expense of a high speed digital signal processor.

In addition, digital signal controllers may offer a larger, more flexible instruction set with a pin out that is configurable to facilitate backward compatibility at the package level and instruction set level with earlier microcontrollers. This backward compatibility when present in the instruction set and/or the pin out tends to make digital signal controller devices and their features programmable by digital signal processor neophytes and helps ensure market penetration of such devices for a broad range of applications. Examples of applications for which digital signal controllers are particularly well suited include in motor control, soft modems, automotive body computers, speech recognition, echo cancellation and fingerprint recognition.

Typically, semiconductor integrated circuit companies that offer devices with digital signal processing capability provide the devices with a set of features and capabilities appropriate for a particular product or application. Thus, these digital signal processors or digital signal controllers may have a broad range of features and capabilities. Semiconductor companies tend to offer their customers a wide range of products incorporating digital signal processing capabilities to meet their customers' needs. For example, a semiconductor company may offer a family of products including a feature-rich "high-end" product (e.g., for automobile applications) and one or more "low-end" products including fewer features (e.g., for household appliance applications).

But while an end-user consumer, concerned only with whether a product works, might be indifferent as to the integrated circuit digital signal processor or controller included in a product, the product designer and manufacturer certainly are not. Product companies generally will expend great efforts to ensure that their products work properly and that consumers receive value and remain satisfied. Thus, product companies tend to select integrated circuit digital signal processors or controllers for use in an application based on their features and capabilities, not to mention costs and other factors.

In view of such circumstances, there tends to be vigorous competition among semiconductor companies for integrated circuit digital signal processor or controller "design wins." In other words, at the design stage, when a products company is designing a product for a given application, semiconductor companies compete for having their digital signal processor or controller included in the product. Once a product company establishes a design and sets the functional pathway configuration for the interface between a digital signal controller and the system in which it is embedded, the product company is less likely to change the configuration to accommodate another integrated circuit digital signal controller having a different functional pathway configuration. Such configuration changes typically result in increased costs for the product company due to the system having to be re-designed in which the integrated circuit digital signal controller is embedded.

While there are a number of factors involved in any decision to award a design win, one such factor comprises a semiconductor company's product "roadmap." Over time, end-user consumers generally tend to favor future generation consumer products having increased features at lower costs. Accordingly, product companies evaluating integrated circuit digital signal controller products of two or more semiconductor companies today will consider whether the particular solutions being offered now will allow them to migrate easily from a basic first generation design to an enhanced future generation design having increased capabilities and features. Such migration—without the products company incurring extensive system re-design costs—in general is necessary if the products company is to offer the future generation products that consumers typically demand.

Accordingly, there remains a need for a simple and convenient functional pathway configuration for the interface between an integrated circuit digital signal controller and the system in which the digital signal controller is embedded, e.g., that tends to promote increased performance with lower costs.

SUMMARY OF THE INVENTION

The present invention may address one or more of the problems set forth above. Certain aspects of the present invention are set forth below as examples. It should be understood that such aspects are presented simply to provide the reader with a brief summary of certain forms the invention might take, and that these aspects are not intended to limit the scope of the invention. Indeed, the invention may encompass a variety of aspects that may not be explicitly set forth below but that naturally follow from the examples and principles described herein.

In one embodiment of the present invention, a functional pathway configuration at the interface between an integrated circuit (IC) digital signal controller and the circuit assembly with which the IC digital signal controller communicates is provided. In a further embodiment, a functional pathway configuration at the interface between a digital signal controller and the circuitry of a system including one or more semiconductor dice.

In accordance with the present invention, in one embodiment a system including the IC digital signal controller may, advantageously, comprise an IC device having a plurality of digital inputs and outputs, clock inputs, one or more analog inputs, one or more analog outputs, and is adapted for connection to power ($V_{DD}$) and ground ($V_{SS}$).

In one aspect, the present invention comprises an IC device including a plurality of connections or "pins." Advantageously, at least one pin comprises a power connection, at least one pin comprises a ground connection, and the remaining pins are input, output or input/output (I/O) connections, wherein each pin may have one or more associated functions. The pins may be analog, digital, mixed-signal (can be analog or digital). Some pins advantageously may be multiplexed with one or more alternate functions for the peripheral features on the IC device so that in general when a function is enabled that particular pin may not be used, for example, as a general purpose I/O pin.

In one embodiment, an IC device in accordance with the present invention advantageously includes 18, 28, 40, 44, 64 or 80 connections or pins. Each pin may be adapted and described according to the function(s) dedicated to the connection, so that all or a portion of the connections together define a functional pathway configuration at the interface between the digital signal controller and the system in which the digital signal controller may be embedded.

In accordance with the present invention, and depending upon the particular application involved, the integrated circuit, with which a system interfaces, may comprise a packaged IC. Examples of types of packaging include a dual in-line package (DIP), which may comprise molded plastic dual in-line package (PDIP) or ceramic dual in-line package (CERDIP); micro lead frame (MLF); pin grid arrays (PGAs); ball grid arrays (BGAs); quad packages; thin packages, such as flat packs (FPs), thin small outline packages (TSOPs), shrink small outline package (SSOP), small outline IC (SOIC) or ultrathin packages (UTPs); lead on chip (LOC) packages; chip on board (COB) packages, in which the chip is bonded directly to a printed-circuit board (PCB); and thin quad flat pack (TQFP) packages which are generally square with pins on all sides; and others. However, for the sake of clarity and convenience only, and without limitation as to the scope of the present invention, reference will be made herein primarily to SOIC, SDIP, PDIP and TQFP ICs.

BRIEF DESCRIPTION OF THE DRAWINGS

Further objects and advantages of the present invention will become apparent upon reading the following detailed description and upon referring to the accompanying drawings in which:

FIGS. 1a–1f are diagrams illustrating exemplary embodiments of 18-pin, 28-pin, 40-pin, 44-pin, 64-pin and 80-pin IC digital signal controllers, respectively, including a functional pathway configuration for the interface between the IC digital signal controller and a system in which it is embedded, in accordance with the present invention, which is well suited for sensor and general purpose controller applications and FIGS. 2a–2e are diagrams illustrating exemplary embodiments of 28-pin, 40-pin, 44-pin, 64-pin and 80-pin IC digital signal controllers, respectively, including a functional pathway configuration for the interface between the IC digital signal controller and a system in which it is embedded, in accordance with the present invention, which is well suited for power conversion and motor control applications.

DETAILED DESCRIPTION OF SPECIFIC EMBODIMENTS

Figure 1D:
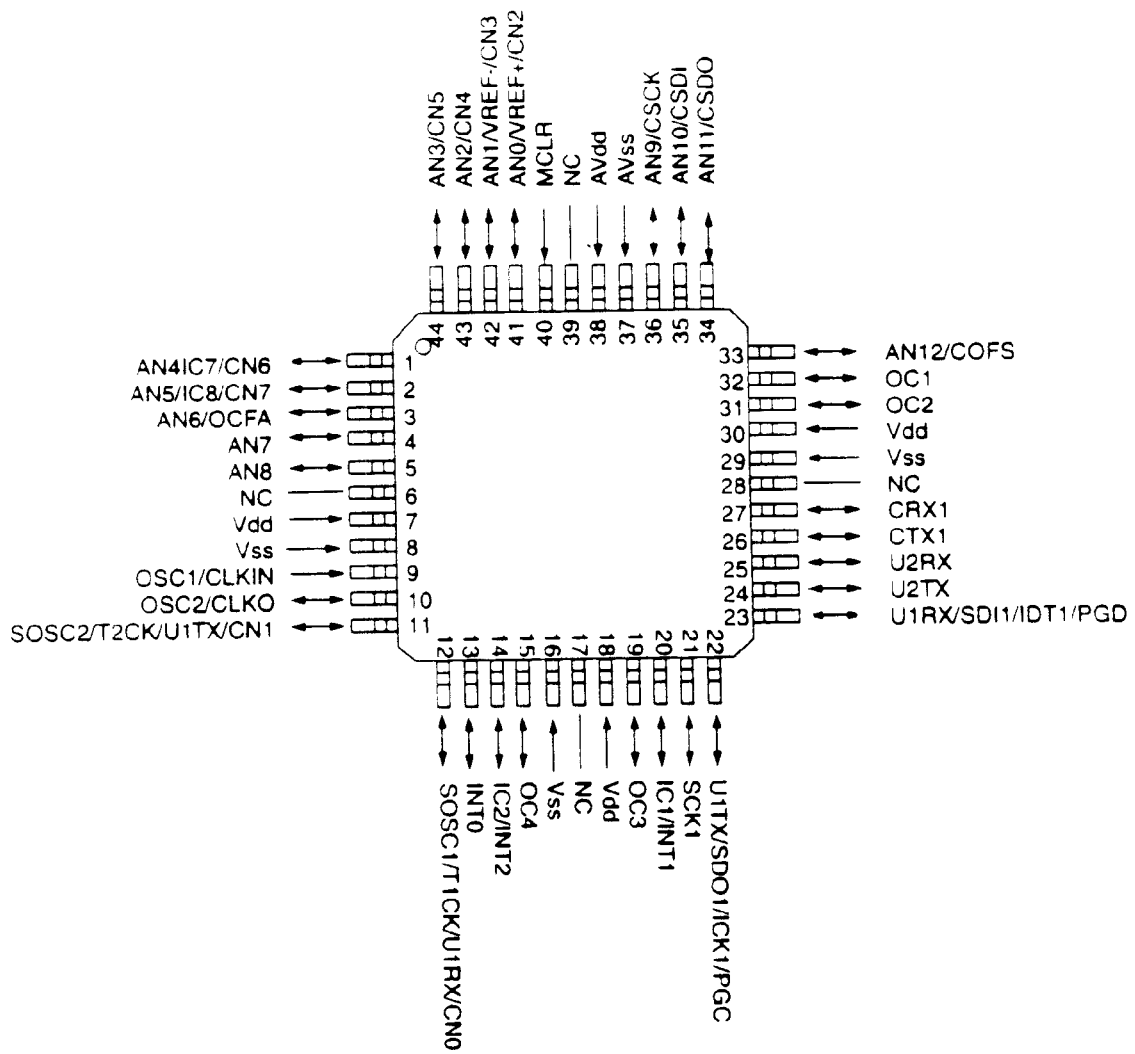

For the sake of clarity and convenience, aspects of the present invention are described in the context of various embodiments typically used in applications generally involving processors with digital signal processing capabilities including digital signal controllers, examples of which are set forth herein. An exemplary family of digital signal controllers may be those available from Microchip Technology Incorporated under the name dsPIC. Exemplary product briefs are attached hereto as Appendix B and incorporated by reference herein for all purposes.

Table 1, appended to the end of the specification, describes an exemplary embodiment of the various functional pathways on an exemplary IC digital signal controller. For each functional pathway, Table 1 describes in exemplary the corresponding function of the pathway and whether it is an input, input/output, analog or power pathway. The exact pin and function names used in any particular embodiment or application may also vary depending upon the naming convention(s) selected. The embodiment described in Table 1 in general may be suited for applications requiring digital signal processing functionality. An embodiment of each functional pathway is also set forth illustratively in more detail in the Appendix A annexed hereto and incorporated by reference herein. Each description set forth in Appendix A is merely exemplary and it will be understood that changes may be made in implementation without departing in scope from the functions as broadly recited.

Each of the pins depicted in the Figures is advantageously adapted with circuitry for a digital signal controller whose configuration may be programmable (e.g., storage registers, microcontrollers, microprocessors, application specific integrated circuits (ASIC), programmable gate arrays (PGA), phase-locked-loop, frequency divider and other devices and/or combinations thereof) is programmed with firmware, to be dedicated to the functions as listed illustratively in Table 1 and in the Appendix A annexed hereto. Of course the exact form of the circuitry and/or firmware used to create such functionality and adapt such pins may vary depending upon the particular application involved. Without limitation as to the scope of the present invention, for the sake of clarity and convenience reference is made herein to a firmware embodiment of the present invention.

FIGS. 1a–1f are diagrams illustrating exemplary embodiments of 18-pin, 28-pin, 40-pin, 44-pin, 64-pin and 80-pin IC digital signal controllers, respectively, including a functional pathway configuration for the interface between the IC digital signal controller and a system in which it is embedded, in accordance with the present invention, which is well suited for sensor and general purpose controller applications.

FIGS. 2a–2e are diagrams illustrating exemplary embodiments of 28-pin, 40-pin, 44-pin, 64-pin and 80-pin IC digital signal controllers, respectively, including a functional pathway configuration for the interface between the IC digital signal controller and a system in which it is embedded, in accordance with the present invention, which is well suited for power conversion and motor control applications.

FIGS. 1a–1f and 2a–2e, depict exemplary embodiments in accordance with the present invention in connection with a plastic small outline integrated circuit (SOIC), molded plastic dual in-line package (PDIP) and thin quad flat pack (TQFP) packages which are generally square with pins on all sides. The embodiments of FIGS. 1a–1f and 2a–2e depict functional pathway configurations for interfacing between the digital signal controllers and systems in which the IC digital signal controller are embedded. Each embodiment of a particular functional pathway configuration may be implemented with a variety of different digital signal controller configurations that have, for example, variations in the types and amount of memory. When the functional pathways are different between devices, the differences may reflect differences in peripherals or core functionality between the devices.

As depicted in FIGS. 1a–1f and 2a–2e, the microcontroller is in general functionally configured with a plurality of bi-directional input-outputs (I/O), some or all of which may be capable of multiple functions, e.g., reset, clock buffer, crystal oscillator, crystal frequency output, serial programming data input and serial programming data clock. In addition pin connections are provided for analog input signals, digital inputs/output signals, power, ground and other signals.

In the SOIC and PDIP packages or other substantially non-square packages, the connection pins associated with the digital signal controller preferably are grouped together on both sides of a vertical axis along a length of a portion of the package (as opposed to across the package). In TQFP packages, the connection pins associated with the digital signal controller preferably are distributed around the four edges of the TQFP package. A configuration including such a feature advantageously increases the ability to simplify routing for system board design and integrated circuit digital signal controller placement therein. Such advantage may prove beneficial in some cases, e.g., to an applications engineer in situations where partitioning of the printed circuit board in which the microcontroller is to be mounted would prove to be advantageous.

In the embodiments shown, the locations of the analog signal AN1-ANX pins are generally positioned in a group of adjacent pins. In addition, separate analog power and ground pins AVdd and Avss, respectively, are included which are separate and distinct from power and ground pins used to power digital circuitry Vdd and Vss. The AVdd and AVss analog power pins are also generally positioned next to each other in one corner of the package to minimize digital noise coupling into the pins from adjacent pins and also to facilitate connecting isolated analog power and ground signals wired within a PCB to these analog power pins. The power supply pins, $V_{DD}$ and Vss are proportional in number to the number of pins on the package. In general, in low pin number packages, there is one set of Vdd and Vss pins which are placed on either side of the package in the center of the package. This placement helps reduce switching noise coupled between adjacent signal pins of the packages. When additional sets of Vdd and Vss pins are present, pins are grouped on the other sides of the IC package.

As illustrated in FIGS. 1a–1f and 2a–2e, some of the pins associated with the digital signal controller may be grouped together for simplification of board layout and signal integrity when there is no possibility of conflict between the signals or when possible conflicts are known and are managed through the multiplexing scheme. An example of pin multiplexing, the OSC1/CLKIN functional pathways are adapted for coupling as an oscillator crystal input or external clock input of the system and the OSC2/CLKOUT functional pathways are adapted for coupling as an oscillator crystal input or external clock output. Numerous other pin multiplexing schemes may be implemented and are shown in FIGS. 1a–1f and FIGS. 2a–2e.

The present invention has been described in terms of exemplary embodiments. In accordance with the present invention, changes may be made to those exemplary embodiments consistent with the principles elaborated in the application and appendices without departing from the spirit and scope of the invention. For example, functions described in table 1 may be selected and realized in a package in any particular order desired based on the functional pathway configuration desired consistent with any constraints described herein and the spirit and scope of the invention. No limitations are intended to the details or construction or design shown herein, other than as described in the claims appended hereto. Thus, it should be clear that the specific embodiments disclosed above may be altered and modified, and that all such variations and modifications are within the spirit and scope of the present invention as set forth in the claims appended hereto.

| PIN NO./NAME | Input/Output/Power | DESCRIPTION OF PIN FUNCTION |
| --- | --- | --- |
| Vdd | Power | Power signal. |
| Vss | Power | Ground signal. |
| Avdd | Analog Power | Analog power signal. |
| Avss | Analog Power | Analog ground signal. |
| PWM0–PWM5 | Output | Pulse width modulation |
| T0CK–T5CK | Input | Timer external clock |
| SCK1–SCK2 | Input/Output | Serial comm. port clock |
| SDI1–SDI2 | Input | Serial comm. port input |
| SS2 | Input | Serial comm. port select |
| MCLR | Input | Reset input |
| PA0–PA5 | Input/Output | General purpose digital I/O |
| FLTA–FLTB | Input | Motor control fault |
| QEA–QEB | Input | Quadrature encoder inputs |
| INDX | Input | Quadrature encoder index |
| AN0–AN15 | Analog | Analog voltage inputs |
| VREF−, VREF+ | Analog | Analog voltage reference |
| U2RTS, U2CTS | Output | Serial UART control |
| IC1–IC8 | Input | Event capture inputs |
| U1RX–U2RX | Input | Serial UART input |
| U1TX–U2TX | Output | Serial UART output |
| SDO1–SDO2 | Output | Serial comm. port output |
| ITD1 | Input/Output | IIC data |
| ICK1 | Input/Output | IIC clock |
| OSC1/CLKIN | Input | Primary oscillator input |
| OSC2/CLKO | Output | Primary oscillator output |
| INT0–INT4 | Input | Process interrupt |
| OC1–OC8 | Output | Event generator |
| SOSC1–SOSC2 | Input/Output | Secondary Oscillator |
| CRX1–CRX2 | Input | CAN bus receiver |
| CTX1–CTX2 | Output | CAN bus transmitter |
| CSCK | Input/Output | Codec clock |
| CSDI | Input | Codec data input |
| CSDO | Output | Codec data output |
| COFS | Input/Output | Codec frame clock |
| UPDN | Input | Quadrature encoder index pulse |
| CN0–CN23 | Input/Output | Input change notification |
| OCFA–OCFB | Analog | Input pin fault protection - PWM |

What is claimed is:

1. An integrated circuit (IC) functional pathway configuration as shown in FIG. 1a.

2. An integrated circuit (IC) functional pathway configuration as shown in FIG. 1*b*.

3. An integrated circuit (IC) functional pathway configuration as shown in FIG. 1*c*.

4. An integrated circuit (IC) functional pathway configuration as shown in FIG. 1*d*.

Figure 1E:
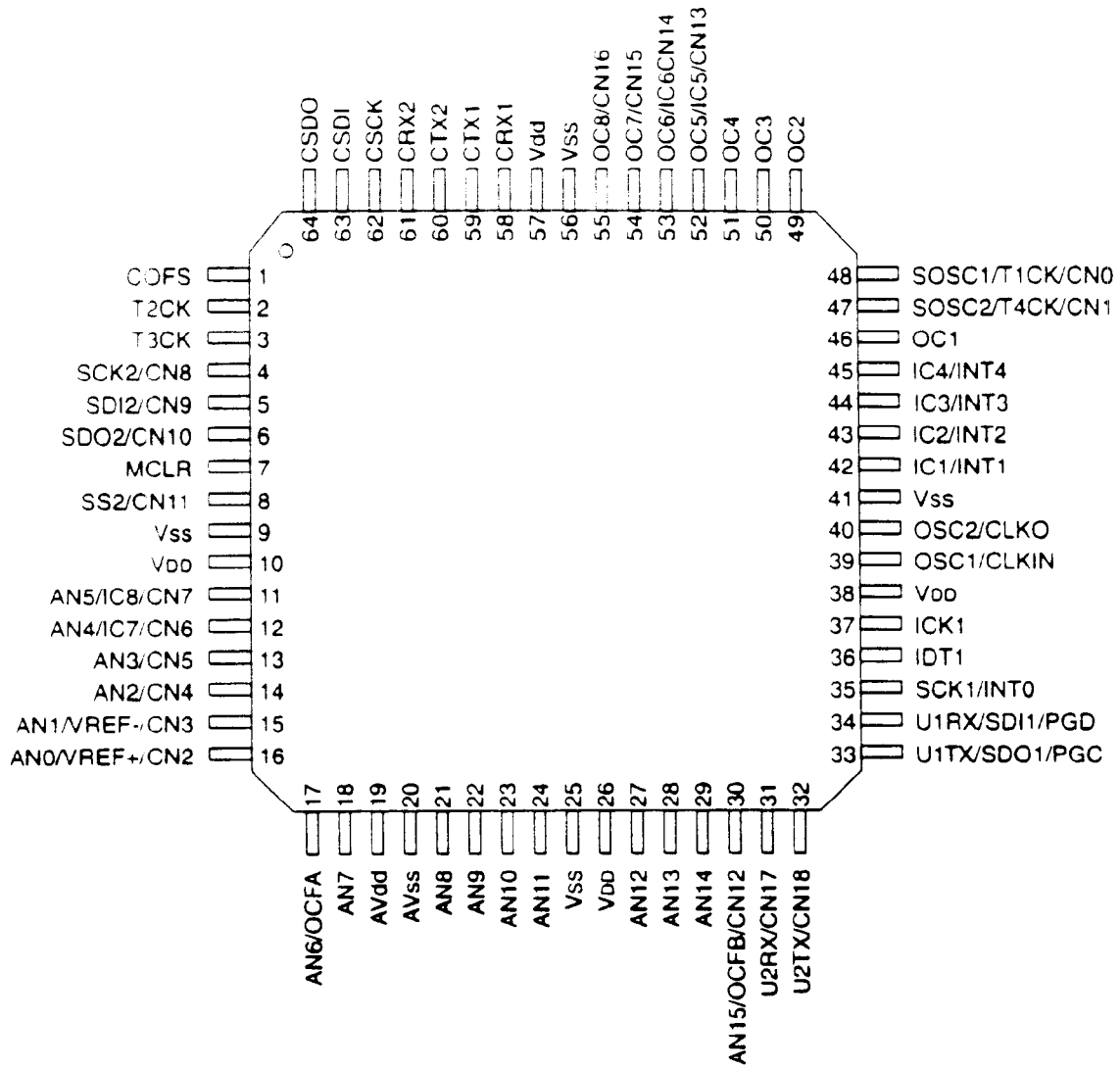
Figure 1F:
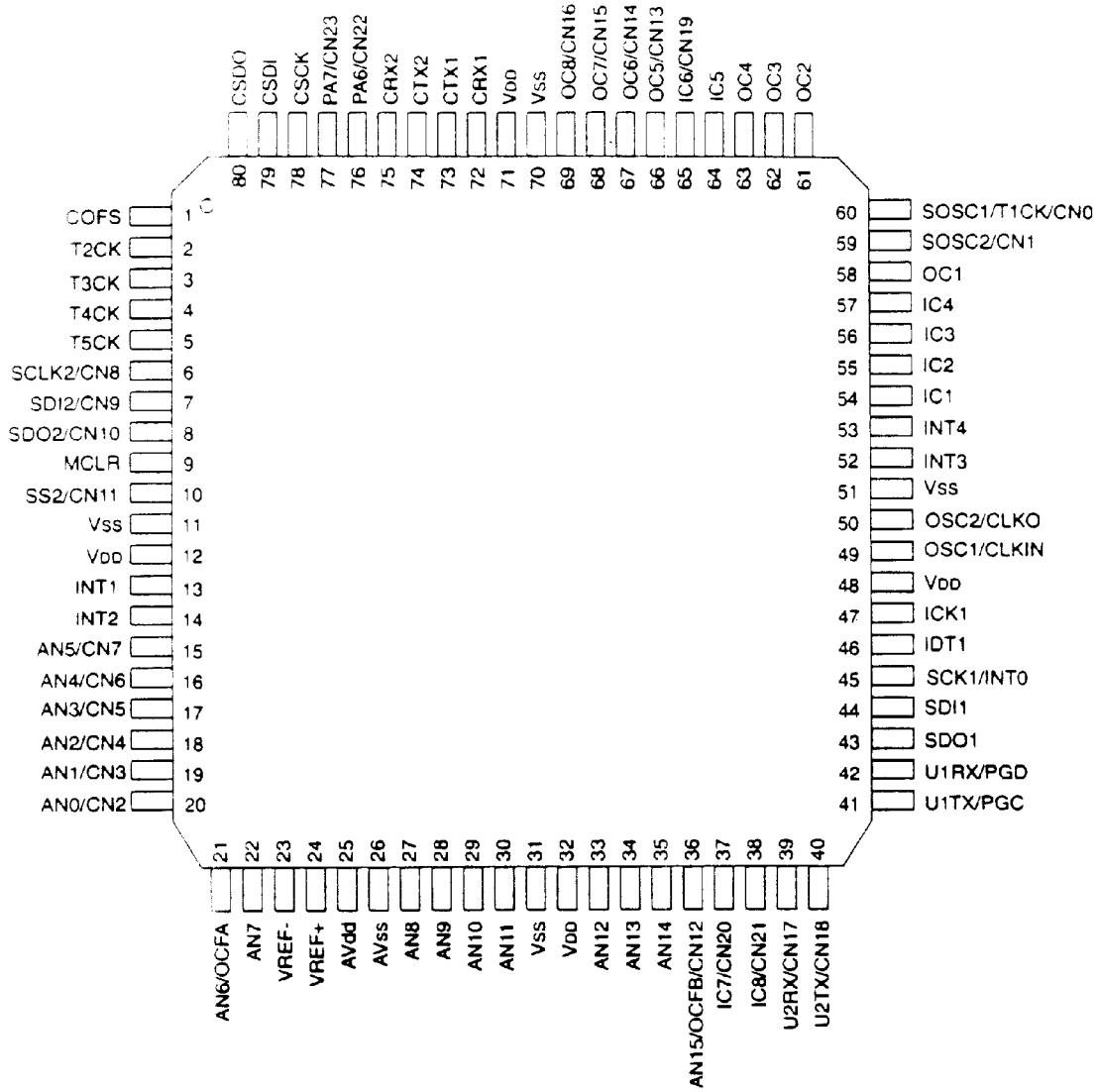

5. An integrated circuit (IC) functional pathway configuration as shown in FIG. 1*e*.

6. An integrated circuit (IC) functional pathway configuration as shown in FIG. 2*a*.

7. An integrated circuit (IC) functional pathway configuration as shown in FIG. 2*b*.

Figure 2C:
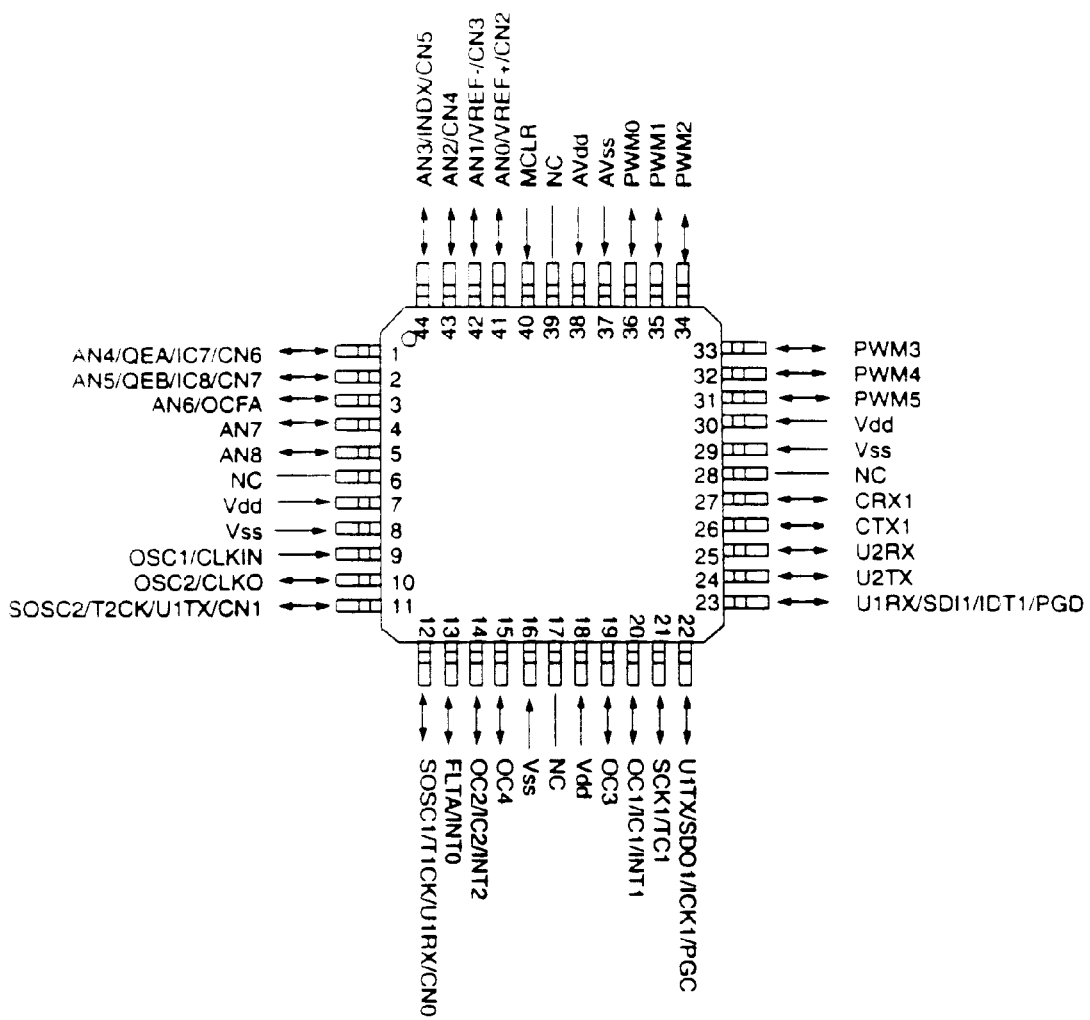

8. An integrated circuit (IC) functional pathway configuration as shown in FIG. 2*c*.

Figure 2D:
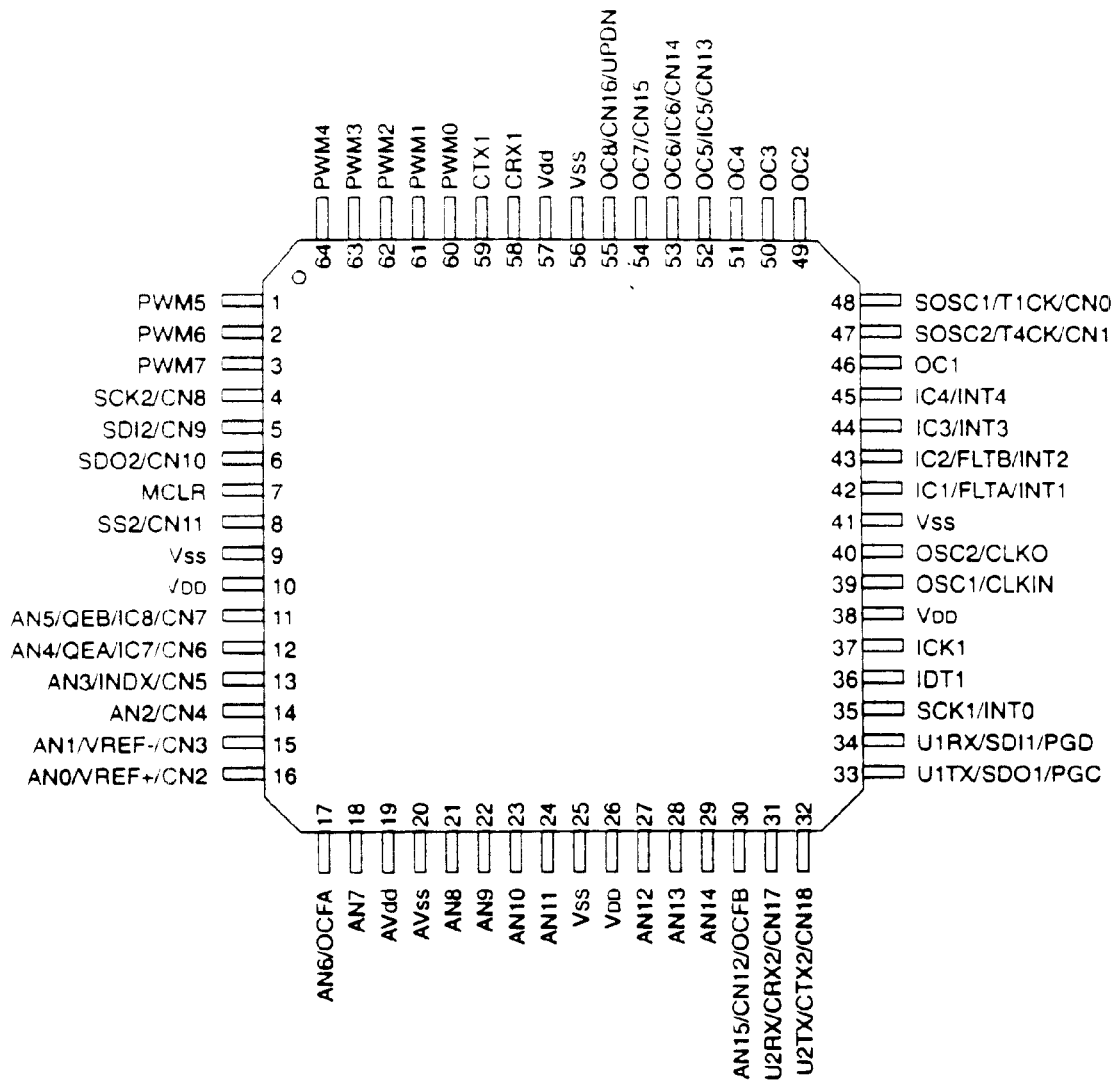

9. An integrated circuit (IC) functional pathway configuration as shown in FIG. 2*d*.

Figure 2E:
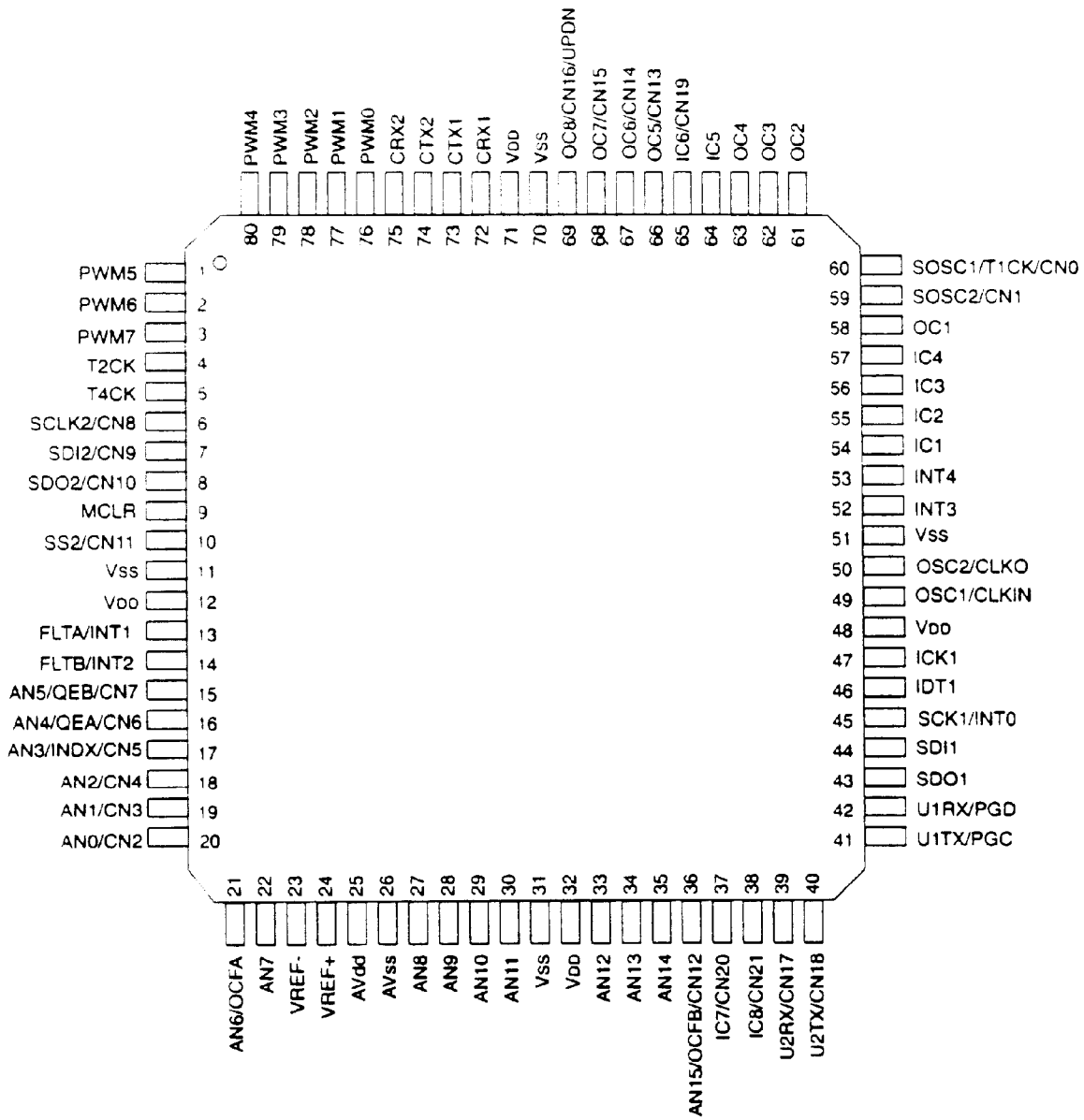

10. An integrated circuit (IC) functional pathway configuration as shown in FIG. 2*e*.

* * * * *